United States Patent

Shinohara

Patent Number: 5,261,627
Date of Patent: Nov. 16, 1993

[54] FISHLINE GUIDE MECHANISM FOR SPINNING REEL FOR FISHING

[75] Inventor: Eiji Shinohara, Tokyo, Japan

[73] Assignee: Daiwa Seiko, Inc., Tokyo, Japan

[21] Appl. No.: 921,404

[22] Filed: Jul. 31, 1992

Related U.S. Application Data

[63] Continuation of Ser. No. 668,063, Mar. 12, 1991, abandoned.

[30] Foreign Application Priority Data

Mar. 15, 1990 [JP] Japan ............... 2-25061
Mar. 15, 1990 [JP] Japan ............... 2-25062

[51] Int. Cl.⁵ .............................. A01R 89/01
[52] U.S. Cl. .............................. 242/231
[58] Field of Search ................... 242/230-233

[56] References Cited

U.S. PATENT DOCUMENTS

| | | | |
|---|---|---|---|
| 2,713,463 | 7/1955 | Sarah | 242/232 X |
| 2,728,534 | 12/1955 | Wallace | 242/231 |
| 3,670,984 | 6/1972 | Lemery | 242/231 |
| 3,743,207 | 7/1973 | McMickle | 242/233 |
| 3,834,644 | 9/1974 | Stackowicz | 242/231 |
| 3,987,976 | 10/1976 | Lilland | 242/232 |
| 4,562,976 | 1/1986 | Ban | 242/231 |
| 4,884,761 | 12/1989 | Kuntze | 242/230 |
| 4,969,613 | 11/1990 | Kaneko | 242/231 |

FOREIGN PATENT DOCUMENTS

| | | | |
|---|---|---|---|
| 994094 | 11/1951 | France | 242/232 |
| 1119852 | 7/1968 | United Kingdom | 242/232 |

Primary Examiner—Daniel P. Stodola
Assistant Examiner—Michael R. Mansen
Attorney, Agent, or Firm—Longacre & White

[57] ABSTRACT

A fishline guide mechanism for a spinning reel in fishing includes a lever provided to a lever support arm on a rotor; a bail; a bail attaching portion gradually expanding from the bail; a fishline roller supported between a tip end of the lever and the bail attaching portion; an annular portion fitted on an end of the bail attaching portion so as to have a surface flush with that of the bail attaching portion; and an anti-tangling portion integrally coupled the annular portion with the lever, the anti-tangling portion extending in front of the roller.

7 Claims, 4 Drawing Sheets

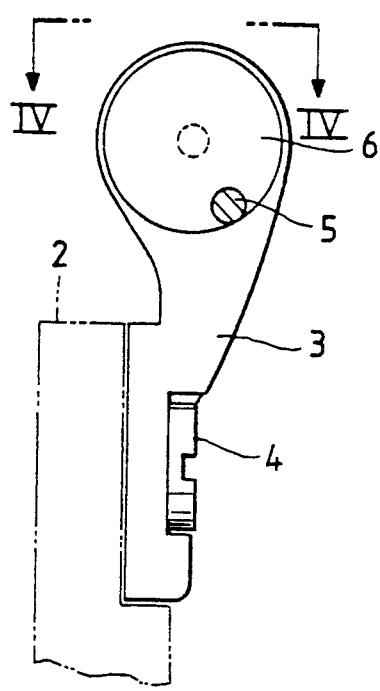
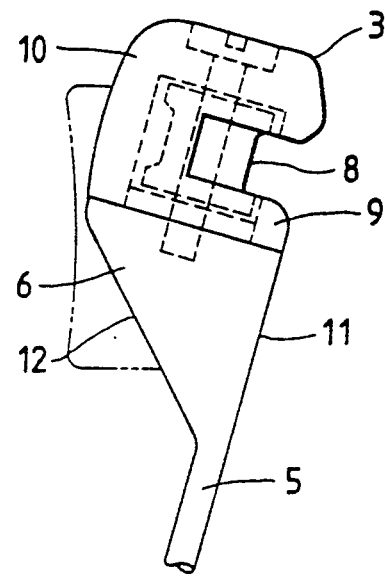
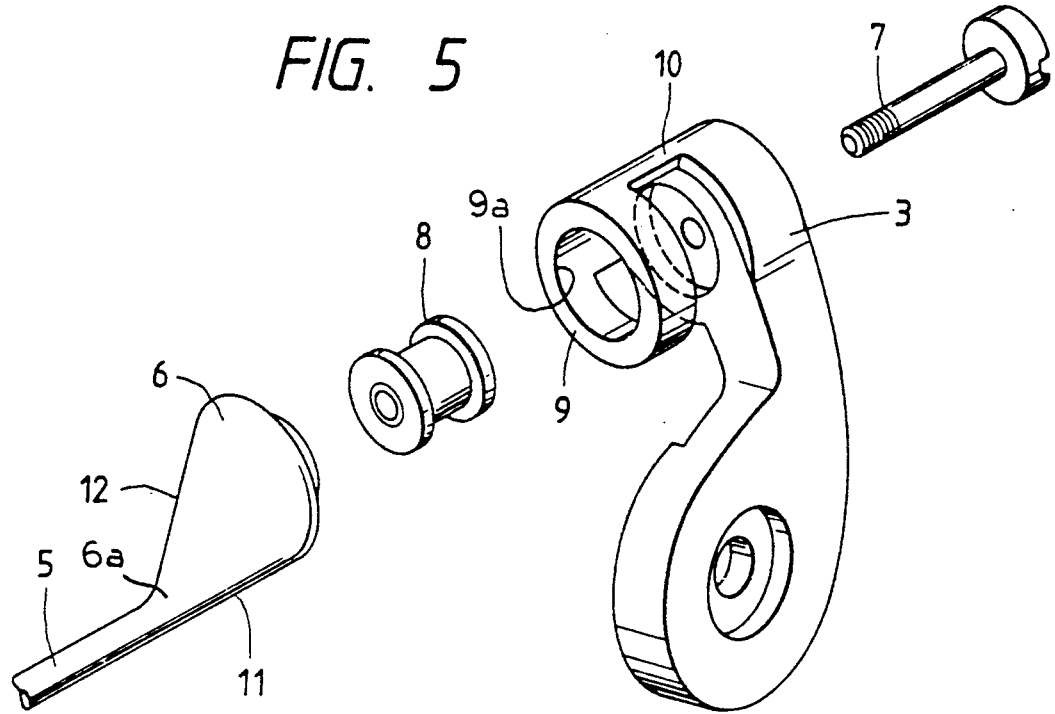

FISHLINE GUIDE MECHANISM FOR SPINNING REEL FOR FISHING

This is a continuation of application Ser. No. 07/668,063, filed Mar. 12, 1991, which was abandoned upon the filing hereof.

BACKGROUND OF THE INVENTION

The present invention relates to an improved fishline guide mechanism for a spinning reel in fishing.

It has been disclosed in the Japanese Utility Model Application No. 18678/86 that in order to prevent a fishline from becoming stuck to the fishline roller of a fishline guide mechanism for a spinning reel in fishing and facilitate the processing of the mechanism, the tip portion of the lever of the mechanism is shaped as U and the fishline roller is supported by the U-shaped tip portion.

However, since the portion of the bail of the mechanism, which is secured directly to the U-shaped tip portion of the lever, extends in such a direction as to rectangularly cross with the axis of the fishline roller, the mechanism has a problem that a height difference wall or a projection is made between the bail attaching portion of the mechanism and the U-shaped tip portion of the lever to let the fishline tangle on the height difference wall or the projection due to the loosening of the fishline, the twisting habit thereof or the like at the time of winding of the fishline to become incapable of being wound or be cut off.

It has also been disclosed in the Japanese Utility Model Application No. 27717/81 that in order to guide a fishline to put it out of an unwound state into a wound state, the bail attaching portion of a fishline guide mechanism for a spinning reel in fishing is formed with an oblique peripheral surface at the fishline roller of the mechanism. However, since a height difference wall is made between the bail of the mechanism and the shaft of the fishline roller, the mechanism has a problem that the fishline tangles or winds on the height difference wall so as to become incapable of being wound on the reel or be cut off.

It has also been disclosed in the Japanese Utility Model Application No. 8056/66 that in order to guide a fishline to put it out of an unwound state into a wound state, the bail attaching portion of a fishline guide mechanism for a spinning reel in fishing is conically shaped and coupled to the shaft of the fishline roller of the mechanism. However, since there is a resistance to the movement of the fishline on the divergent surface of the conically-shaped attaching portion toward the fishline roller, the mechanism has a problem that the fishline cannot be smoothly guided to the fishline roller and is likely to tangle on the projecting portion of an attaching nut, a lever or the like.

SUMMARY OF THE INVENTION

The present invention was made in order to solve the problems mentioned above.

Accordingly, it is an object of the present invention to provide a fishline guide mechanism which is for a spinning reel for fishing and operates so that a fishline is prevented from tangling on any of the bail attaching portion and fishline roller fitting portion of the mechanism. In the mechanism, a fishline roller is supported between the tip portion of a lever and a bail attaching portion gradually expanding from a bail, an annular portion, which is fitted on the end of the bail attaching portion so as to have a surface flush with that of the bail attaching portion, and the lever are integrally coupled to each other by an anti-tangling portion extending in front of the fishline roller, and the bail extends from the bail attaching portion along the axis of the fishline roller. In an alternate indication of this structure, the annular portion and anti-tangling portion may be omitted.

The bail attaching portion may either be made conically divergent from the bail so as to make the bail nearly coaxial with the fishline roller, or be shaped to place the fishline guide surface of the bail attaching portion nearly on the same plane as the surface of the bail and make the axis of the bail not coincident with that of the fishline roller.

When the fishline is wound on the spinning reel after the bail is inverted from a fishline unwinding position to a fishline winding position, the fishline is taken in by the bail and then moved from the bail to the fishline roller while being guided by the bail attaching portion, so that the fishline is wound on the spool of the reel. At that time, even if the fishline winds on the joint of the lever and the bail attaching portion due to the loosening of the fishline under the change in the tension thereof, the twisting habit of the fishline or the like, the fishline slips on the joint so that the fishline easily goes off the joint, namely, the fishline is prevented from tangling thereon.

Since the surface of the fishline guide part of the bail attaching portion of the fishline guide mechanism is nearly flush with that of the bail, the fishline can be smoothly and properly taken in and guided to the fishline roller so as to be securely wound on the spool after the bail is inverted from the fishline unwinding position to the fishline winding position. Even if the fishline winds on the bail attaching portion or the lever due to the loosening of the fishline under the change in the tension thereof, the twisting habit of the fishline or the like during the winding of the fishline on the spool, the fishline slips on the gradually expanded surface of the bail attaching portion so that the fishline easily goes off the portion namely, the fishline is prevented from tangling thereon, to surely avoid such a trouble that the fishline becomes incapable of being wound on the spool or is cut off. Since the annular portion integrally coupled to the lever by the anti-tangling portion is fitted on the end of the bail attaching portion, the fishline roller is well protected from an external force and the bail attaching portion having the fishline guide part and the lever are firmly coupled to each other, to make it possible to always stably guide the fishline. Desirable effects are thus produced in accordance with the present invention.

DESCRIPTION OF THE DRAWINGS

FIG. 3 is a sectional view of the major part along a line III—III show in FIG. 3;

FIG. 4 is a view of the major part seen along arrows IV shown in FIG. 3;

FIG. 5 is a perspective exploded view of the major part;

DETAILED DESCRIPTION OF EXEMPLARY EMBODIMENTS

Figure 1:
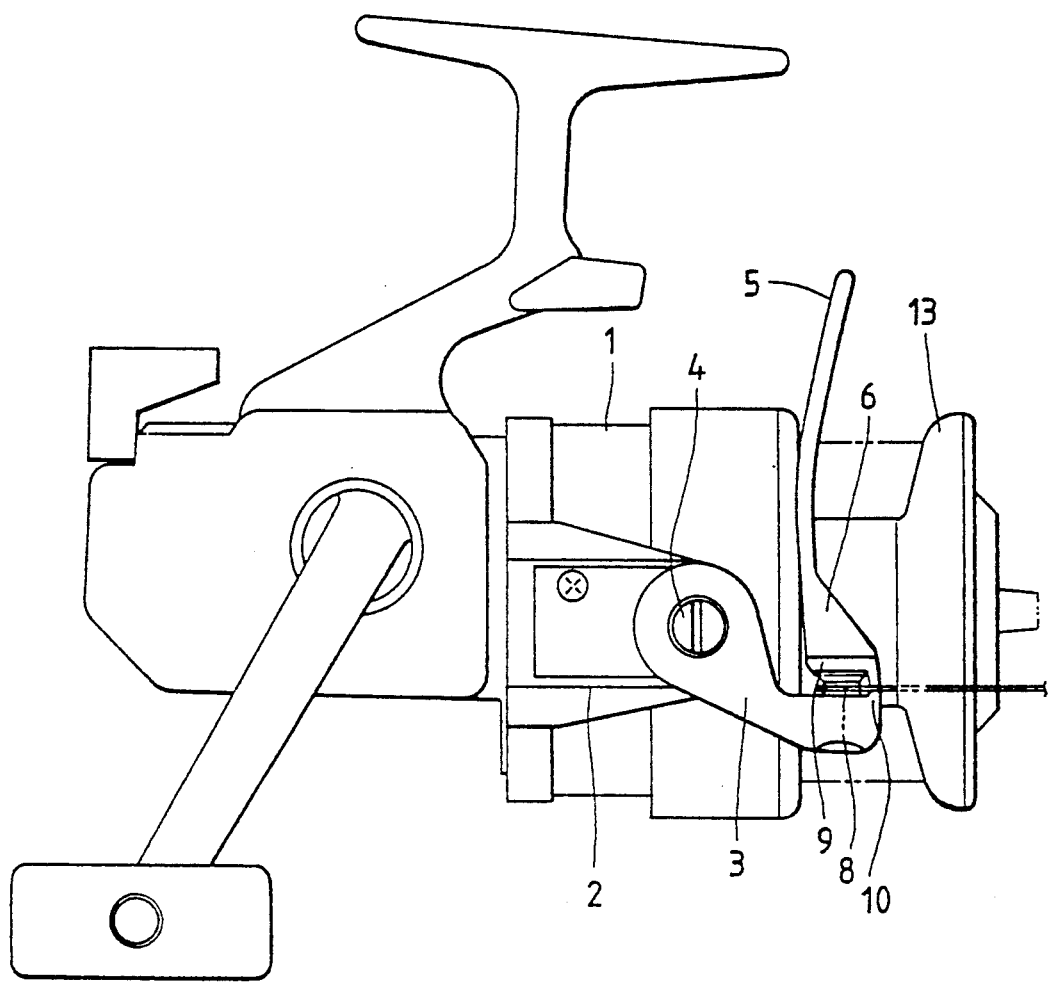
FIG. 1 is a side view of a spinning reel provided with a fishline guide mechanism which is an embodiment of the present invention.

Embodiments of the present invention are hereafter described in detail with reference to the drawings attached hereto.

FIGS. 1, 2, 3, 4 and 5 show a fishline guide mechanism which is for a spinning reel in fishing and is one of the embodiments. The fishline guide mechanism includes a lever support arm 2, a leer 3, a pin 4, a bail 5, a bail attaching portion 6 connected to the bail 5 at junction 6a, a securing screw 7, a fishline roller 8, an annular portion 9 provided with an aperture 9a, and an anti-tangling portion 10. The lever 3 is pivotally coupled to the front end of the lever support arm 2 by the pin 4 in a conventional manner. The fishline roller 8 is supported on the securing screw 7 between the tip portion of the lever 3 and the bail attaching portion 6. The annular portion 9 is fitted on the end face of the bail attaching portion 6. The annular portion 9 and the lever 3 are integrally coupled to each other by the anti-tangling portion 10 extending in front of the fishline roller 8. The cross-sectional area of the bail attaching portion 6 is gradually increased from the bail 5 toward the annular portion 9 so that the axis of the bail 5 extends along that of the securing screw 7 but is located nearer the lever support arm 2 than the latter axis is, and the bail attaching portion has a fishline guide surface 11 nearly flush with the surface of the bail 5, and an oblique expanding surface 12 flush with the peripheral surface of the annular portion 9.

Figure 2:
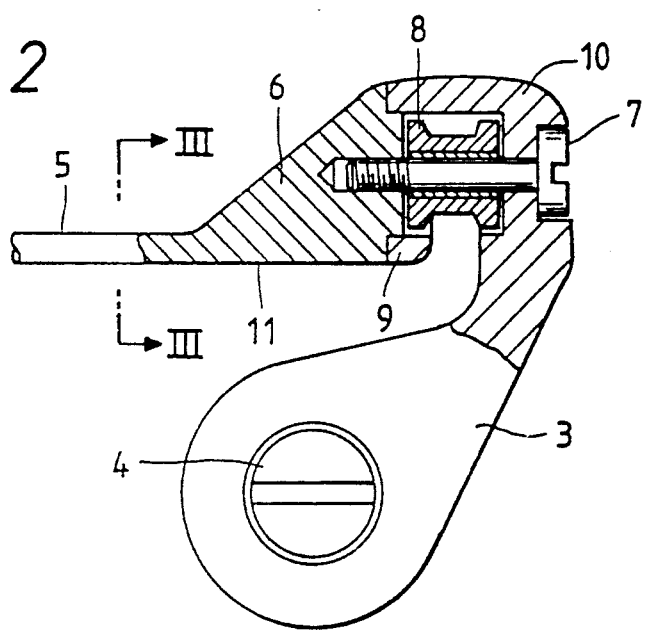
FIG. 2 is a cutaway side view of a major part of the mechanism.

When the rotor 1 is rotated after the bail 5 is inverted from a fishline unwinding position to a fishline winding position as shown in FIGS. 1 and 2, a fishline unwound from the spool 13 of the spinning reel is taken in by the bail and then moved from the bail to the fishline roller 8 While being guided by the bail attaching portion 6, so that the fishline is wound on the spool. At that time, even if the fishline winds on the bail attaching portion 6 or the lever 3 due to the loosening of the fishline, the twisting habit thereof or the like, the fishline slips on the oblique expanding surface 12 of the bail attaching portion or the surface of the anti-tangling portion 10 of the lever, each of which does not have a height difference wall or a projection and is therefore smooth, so that the fishline easily goes off the bail attaching portion or the lever, namely, the fishline is prevented from tangling thereon.

Figure 6:
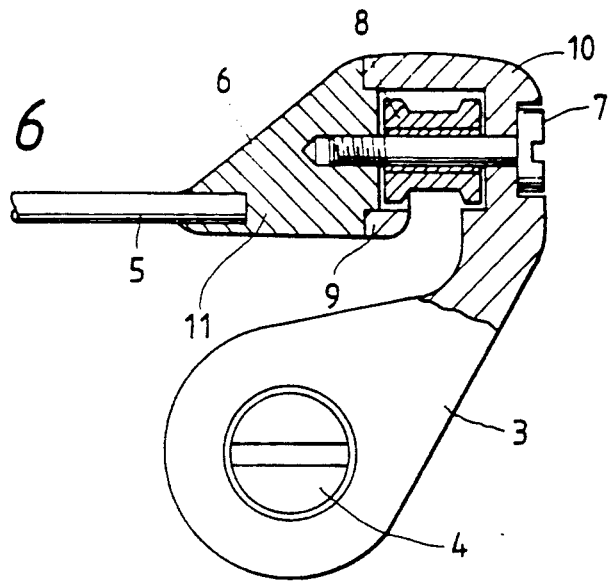
FIG. 6 is a cutaway side view of a major part of a fishline guide mechanism which is for a spinning reel and is another embodiment of the present invention.

FIG. 6 shows a fishline guide mechanism which is for a spinning reel in fishing and is another of the embodiments. The difference of the mechanism from that shown in FIGS. 1, 2, 3, 4 and 5 is that a bail attaching member 6 is formed separately from a bail 5 and then secured thereto by welding or other means.

Figure 7:
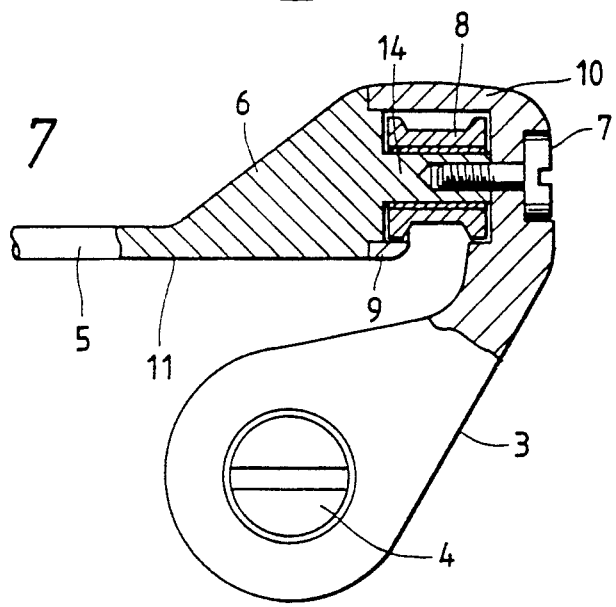
FIG. 7 is a cutaway side view of a major part of a fishline guide mechanism which is for a spinning reel and is yet another embodiment of the present invention.

FIG. 7 shows a fishline guide mechanism which is for a spinning reel in fishing and is yet another of the embodiments. The difference of the mechanism from that shown in FIGS. 1, 2, 3, 4 and 5 is that a bail attaching portion 6 has a projecting part 14 supporting a fishline roller 8.

Figure 8:
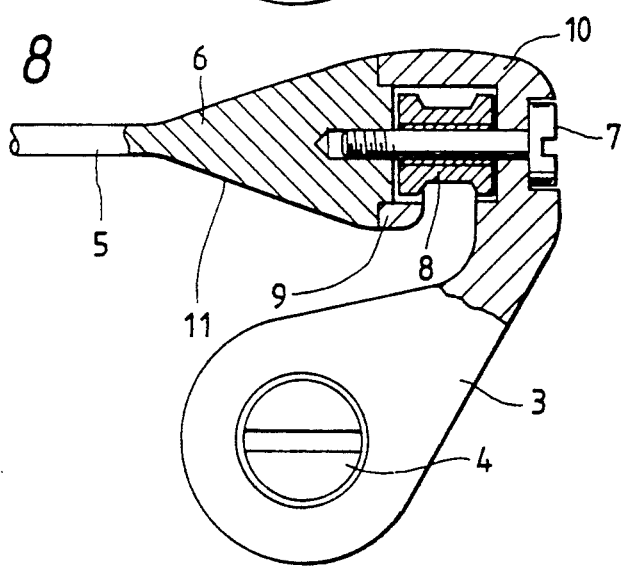
FIG. 8 is a cutaway side view of a major part of a fishline guide mechanism which is for a spinning reel and is yet another embodiment of the present invention.

FIG. 8 shows a fishline guide mechanism which is for a spinning reel for fishing and is yet another of the embodiments. The difference of the mechanism from that shown in FIGS. 1, 2, 3, 4, and 5 is that a bail attaching portion 6 is conically expanded so that the axis of a bail 5 is nearly coincident with that of a fishline roller 8.

Figure 9:
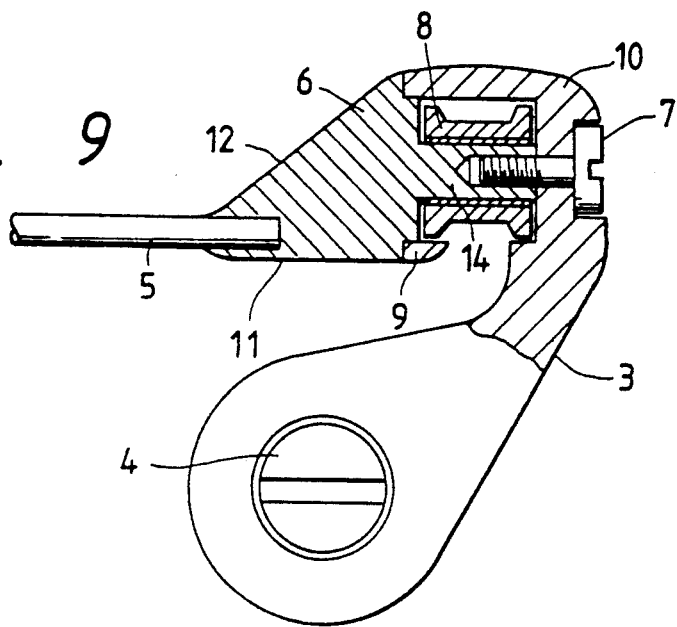
FIG. 9 is a cutaway side view of a major part of a fishline guide mechanism which is for a spinning reel and is yet another embodiment of the present invention.

FIG. 9 shows a fishline guide mechanism which is for a spinning reel for fishing and is yet another of the embodiments The difference of the mechanism from that shown in FIGS. 1, 2, 3, 4 and 5 is that a bail attaching member 6 is formed separately from a bail 5 and then secured thereto by welding or other means, and a fishline roller 8 is supported by the projecting part 14 of the bail attaching member.

Figure 10:
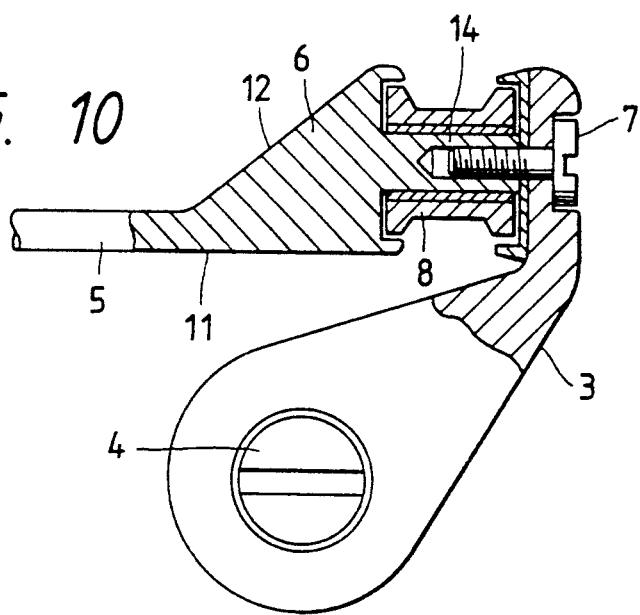
FIG. 10 is a cutaway side view of a major part of a fishline guide mechanism which is for a spinning reel and is yet another embodiment of the present invention.

FIG. 10 shows a fishline guide mechanism which is for a spinning reel for fishing and is yet another of the embodiments. The difference of the mechanism from that shown in FIGS. 1, 2, 3, 4 and 5 is that a lever 3 does not have an annular portion and an anti-tangling portion.

The present invention is not confined to the embodiments described above, but may be embodied or practiced in other various ways without departing the spirit or essential character of the invention.

What is claimed is:

1. A fishline guide mechanism for a spinning reel in fishing, comprising:
   a lever provided on a lever support arm on a rotor;
   a bail;
   a bail attaching portion gradually expanding from said bail to a maximally expanded extremity;
   a junction at which said bail and said bail attaching portion meet;
   a fishline roller supported between a tip end of said lever and said bail attaching portion;
   an annular portion fitted on an end of said bail attaching portion, said annular portion having an outer circumferential surface congruent and flush with the expanded extremity of said bail attaching portion and an aperture coaxial with an axis of said roller, said aperture formed to receive said roller and at least a portion of said bail attaching portion; and
   an anti-tangling portion integrally coupling said annular portion with said lever, said anti-tangling portion extending parallel to an axis of said roller.

2. A fishline guide mechanism for a spinning reel in fishing, according to claim 1, wherein said bail extends from said bail attaching portion substantially coaxially with said roller.

3. A fishline guide mechanism for a spinning reel in fishing, according to claim 1, wherein said junction is offset from said axis of said roller.

4. A fishline guide mechanism for a spinning reel in fishing, according to claim 1, wherein said bail attaching portion defines a fishline guide surface and an oblique expanding surface, said fishline guide surface is coplanar with a peripheral guide surface of said bail, said oblique expanding surface expanding toward said expanded extremity which is radially larger than an outside peripheral edge of said roller.

5. A fishline guide mechanism for a spinning reel in fishing, comprising:
- a lever provided on a lever support arm on a rotor;
- a bail;
- a bail attaching portion attached to said lever;
- a junction at which said bail and said bail attaching portion meet; and
- a fishline roller supported between a tip end of said lever and said bail attaching portion, said roller adapted to be separated from said lever by translation along an axis of said roller;
- wherein said bail attaching portion defines a fishline guide surface coplanar with a peripheral guide surface of said bail and an oblique expanding surface expanding toward a peripheral edge of said lever, and said junction is offset from an axis of said roller,
- an annular portion fitted on an end of said bail attaching portion, said annular portion having an outer circumferential surface congruent and flush with the expanded extremity of said bail attaching portion and an aperture coaxial with an axis of said roller, said aperture formed to receive said roller and at least a portion of said bail attaching portion; and
- an anti-tangling portion integrally coupling said annular portion with said lever, said anti-tangling portion extending parallel to an axis of said roller.

6. A fishline guide mechanism for a spinning reel in fishing. comprising:
- a lever provided on a lever support arm on a rotor;
- a bail;
- a bail attaching portion gradually expanding from said bail to a maximally expanded extremity;
- a junction at which said bail and said bail attaching portion meet;
- a fishline roller supported between a tip end of said lever and said bail attaching portion;
- an annular portion located on an end of said bail attaching portion and defining an aperture, said roller being inserted through said aperture into said annular portion and secured at said tip end of said lever by said bail attaching portion which is then affixed to said annular portion, said annular portion having an outer circumferential surface congruent and flush with the expanded extremity of said bail attaching portion and said aperture coaxial with an axis of said roller; and
- an anti-tangling portion integrally coupling said annular portion with said lever, said anti-tangling portion extending parallel to an axis of said roller.

7. A fishline guide mechanism according to claim 6, wherein said bail attaching portion is affixed to said annular portion by a securing means passing through said roller and into said bail attaching portion.

* * * * *